United States Patent [19]

Mahoney et al.

[11] Patent Number: 5,455,898
[45] Date of Patent: Oct. 3, 1995

[54] ANALYZING AN IMAGE SHOWING A GRAPHICAL REPRESENTATION OF A LAYOUT

[75] Inventors: James V. Mahoney, San Francisco, Calif.; Satyajit Rao, Bangalore, Ind.

[73] Assignee: Xerox Corporation, Stamford, Conn.

[21] Appl. No.: 158,132

[22] Filed: Nov. 24, 1993

[51] Int. Cl.$^6$ .................................................. G06F 15/00
[52] U.S. Cl. ............................................................ 395/133
[58] Field of Search .................................. 395/133, 140, 395/141, 143, 134; 345/118, 119, 120

[56] References Cited

U.S. PATENT DOCUMENTS

| | | | |
|---|---|---|---|
| 4,542,378 | 9/1985 | Suganuma et al. | 340/734 |
| 5,243,439 | 9/1993 | Jacobus et al. | 358/448 |
| 5,257,327 | 10/1993 | Hirosawa | 382/56 |
| 5,274,468 | 12/1993 | Ojha | 358/448 |
| 5,363,211 | 11/1994 | Hasebe et al. | 358/451 |

OTHER PUBLICATIONS

Suenaga, Y., and Nagura, M., "A Facsimile Based Manuscript Layout and Editing System by Auxiliary Mark Recognition," 5th International Conference on Pattern Recognition, vol. 2, IEEE, 1980, pp. 856–858.

Helm, R. Marriott, K., Odersky, M., "Building Visual Language Parsers," in Proceedings of CHI, 1991 (New Orleans, Louisiana, Apr. 29–May 2, 1991), ACM, New York, 1991, pp. 105–112.

Suenaga, Y., "Some Techniques for Document and Image Preparation," *Systems and Computers in Japan*, vol. 17, No. 3, 1986, pp. 35–46.

Primary Examiner—Phu K. Nguyen

[57] ABSTRACT

Input image data define an input image set that shows a graphical representation of a layout with two or more segments. The graphical representation can be a sketch, and can include, for example, a rectangular boundary with lines parallel to its sides defining rectangular segments within the boundary. The input image data are used to obtain segment source data indicating a source for each segment and segment position data indicating a position for each segment. The segment source data can indicate, for each segment of the layout, one of a number of source images in the input image set. The segment position data can indicate a reference point and a width and height for each segment. The source image for a segment can be a sketch of a graphical representation—such as a node-link structure, a parallel length graph, a proportioned parts graph, a row/column representation, a perimeter relationship representation, or a two-dimensional graph—that can be categorized and rendered to obtain data defining a precisely formed graphical representation. The segment source data for other segments and the segment position data can be used with the data defining the precisely formed graphical representation to obtain output image data defining an output image that includes a layout as represented by the graphical representation.

26 Claims, 11 Drawing Sheets

ANALYZING AN IMAGE SHOWING A GRAPHICAL REPRESENTATION OF A LAYOUT

BACKGROUND OF THE INVENTION

The present invention relates to techniques for analyzing an image that includes information about a layout.

Suenaga, Y., and Nagura, M., "A Facsimile Based Manuscript Layout and Editing System by Auxiliary Mark Recognition," *5th International Conference on Pattern Recognition,* Vol. 2, IEEE, 1980, pp. 856–858, describe an editor that uses handwritten mark recognition. Information for manuscript editing is input from a facsimile transmitter. Original texts, graphics, and auxiliary marks drawn on paper are input to the system as binary pictures. The marks are recognized to make a picture allocation list and a graphic command list. Handwritten alphanumerics in graphics are extracted and recognized by OCR. Fair copies of texts and graphics are constructed based on the lists and are output to a facsimile receiver. As shown and described in relation to FIG. 2 of Suenaga's paper, the system includes a text editing subsystem and a graphics editing subsystem. The text editing subsystem, described at page 857, handles almost all kinds of texts having arbitrary size and format, including graphics patterns, estimating all parameters and instructions needed for editing from pictures of texts and marks. In Suenaga's paper, FIG. 3 shows marks, and FIGS. 4(a) and 4(b) show an example of handwritten text editing. The graphical editing subsystem, described at page 858, reforms line drawings using straight line or circular arc approximation and recognizes characters by OCR if marks specify to do so. FIG. 5 shows handwritten marks and seal marks. Marks are recognized by a procedure based on border following, to construct a mark parameters list for graphics. The picture of graphics is divided into portions—pixels surrounded by "cutout-P" marks are extracted to be stored in a binary picture file; pixels surrounded by "cutout-C" marks are extracted and sent to OCR to be recognized; and the remaining pixels are regarded as line drawings and expressed by a line drawings list (LDL). In accordance with the LDL, line drawings specified by certain marks are approximated by straight lines, circular arcs, or predetermined templates such as rectangles etc. A graphic command list is constructed and graphics are generated accordingly. An example is shown in FIGS. 6 and 1 in Suenaga's paper.

SUMMARY OF THE INVENTION

The invention is based on the discovery of a technique for analyzing an image set showing a graphical representation of a layout of image segments. The technique analyzes the graphical representation to obtain information about the layout. The graphical representation can, for example, be a sketch of a layout.

The technique is based on the observation that two types of information are needed to lay out image segments—source information indicating sources of segments and position information indicating positions of segments.

The technique is further based on the discovery that a graphical representation of a layout can include both segment source information and segment position information.

The technique obtains input image data defining an input image set showing a graphical representation of a layout that includes two or more segments. The graphical representation can, for example, be a sketch of the layout. The technique uses the input image data to obtain segment source data indicating a source for each segment and segment position data indicating a position for each segment.

The technique can, for example, obtain segment position data that indicate, for each segment, a width, a height, and a reference point. The graphical representation can include segment representations, and the technique can obtain relative position data indicating the position of each segment representation relative to the graphical representation, then use the relative position data to obtain the segment position data. For example, the graphical representation can have a rectangular boundary within which lines parallel to the sides define rectangular segment representations; in this case, each segment's relative position data can indicate position relative to a corner of the rectangular boundary.

Similarly, the technique can obtain segment source data. The input image set can include an image source sheet that indicates a source image, and the segment source data can indicate that the image source sheet is a source for one of the segments. The image source sheet can include marks that indicate a source identifier. The graphical representation can also include marks indicating a segment identifier. The technique can obtain source identifier data indicating the source identifer indicated by the image source sheet and segment identifier data indicating the segment identifier indicated by the graphical representation; then the technique can use the source identifier data and the segment identifier data to determine whether the image source sheet is a source for the segment. The source and segment identifier data can each indicate a count of connected components, for example.

The input image set can indicate the source image in other ways. For example, the input image set can show a sketch of a source graphical representation. The technique can obtain content data indicating information represented by the source graphical representation; the technique can obtain a precisely formed graphical representation representing the information indicated by the content data. The source graphical representation can, for example, be a node-link structure such as a directed graph, a parallel length graph such as a bar graph, or a proportioned parts graph such as a pie chart.

The technique can use the segment source data and the segment position data to obtain output image data defining an output image that includes a layout as represented by the graphical representation.

The technique can be implemented with a machine that includes image input circuitry and data indicating image processing instructions. The image input circuitry can receive image data defining an image set that shows a graphical representation of a layout that includes two or more image segments. The graphical representation includes segment source information indicating sources of the segments in the layout and segment position information indicating positions of the segments within the layout. The machine's processor can execute the image processing instructions. In executing the image processing instructions, the processor can receive the image data from the image input circuitry and use the image data to obtain segment source data indicating a source for each segment and segment position data indicating a position for each segment. The machine can be a high-speed image processing server that responds to image processing requests from a network to which it is connected.

The machine can also include image output circuitry, and the processor can use the segment source data and the segment position data to obtain output image data defining an output image that includes a layout as represented by the graphical representation. Each segment can be scaled to fit within a width and height indicated by the segment position data and can be positioned at a reference point indicated by the segment position data. The processor can provide the output image data to the image output circuitry. The machine can be a fax server or a copier.

The technique can also be implemented in a software product that includes a storage medium and data stored by the storage medium. The software product can be used in a machine that includes image input circuitry. The data stored by the storage medium can include image processing instructions the machine's processor can execute. In executing the image processing instructions, the processor can receive input image data from the image input circuitry defining an input image set that shows a graphical representation of a layout that includes two or more image segments. The graphical representation includes segment source information indicating sources of the segments in the layout and segment position information indicating positions of the segments within the layout. In executing the image processing instructions, the processor can receive the input image data from the image input circuitry and use the input image data to obtain segment source data indicating a source for each segment and segment position data indicating a position for each segment.

The technique described above is advantageous because it provides a way for a computer to obtain data about a layout of image segments. A user can, for example, provide a simple sketch of a layout for analysis. The sketch can specify spatial information about the layout intuitively, without precise measurement and keyboard entry of a description of the layout and also without a complicated special syntax. The sketch can specify information intuitively because a graphical representation of a layout can be similar to other familiar graphical representations, and the computer can then do the work necessary to interpret the sketch to obtain segment source data and segment position data.

The technique can provide data that can be used to control a system, such as commands that the system can execute to produce data defining an image; the system could be a desktop publishing system such as LaTex or a similar system. Or the data can be used to directly produce data defining an output image showing a layout as represented by the sketch.

The following description, the drawings, and the claims further set forth these and other aspects, objects, features, and advantages of the invention.

DETAILED DESCRIPTION

A. Conceptual Framework

Figure 1:
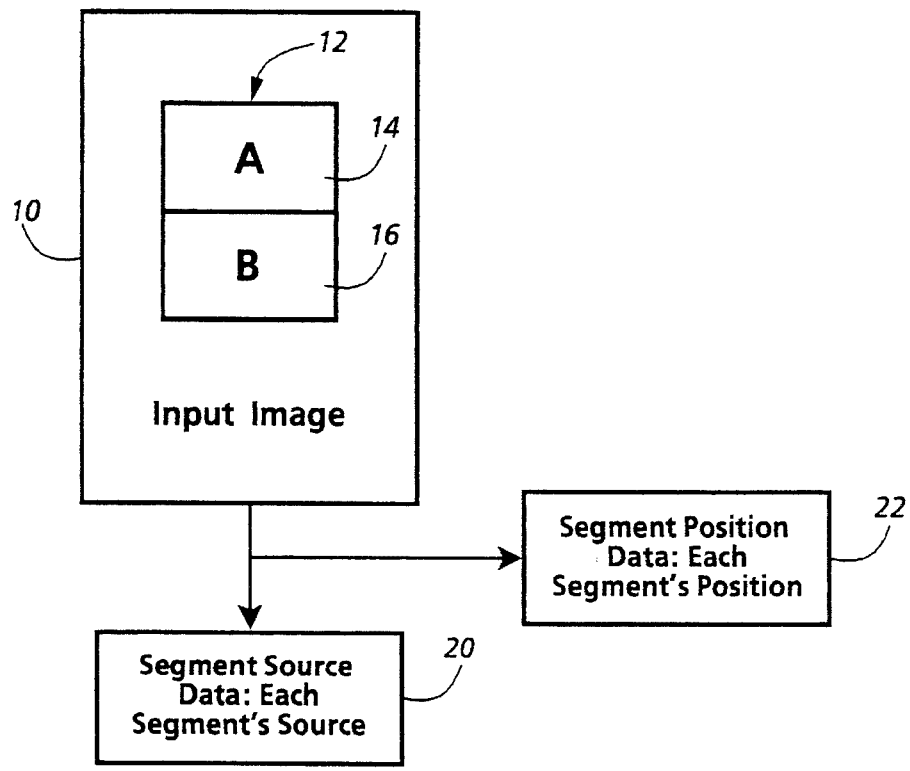
FIG. 1 is a schematic diagram illustrating how an image showing a graphical representation of a layout can be analyzed.

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low."

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "data processing system" is a physical system that processes data. A "data processor" or "processor" is any component or system that can process data, and may include one or more central processing units or other processing components. A processor performs an operation or a function "automatically" when it performs the operation or function independent of concurrent human control.

Any two components are "connected" when there is a combination of circuitry that can transfer signals from one of the components to the other.

A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor or other component of circuitry "uses" an item of data in performing an operation when the result of the operation depends on the value of the item. For example, the operation could perform a logic or arithmetic operation on the item or could use the item to access another item of data.

An "instruction" is an item of data that a processor can use to determine its own operation. A processor "executes" a set of instructions when it uses the instructions to determine its operations.

A "control signal" is a signal provided to a machine or other system that can cause a change in the system's state, such as by changing the way in which the system operates. In executing a set of instructions, a processor may, for example, provide control signals to internal components within the processor and to external components connected to the processor, such as input/output devices.

A signal "requests" or "is a request for" an event or state when the signal can cause occurrence of the event or state.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

An item of data "identifies" or "is an identifier of" one of a set of identifiable items if the item of data is one of a set of items of data, each of which can be mapped to at most one of the identifiable items.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An item of data "indicates" a thing, an event, or a characteristic when the item has a value that depends on the existence or occurrence of the thing, event, or characteristic or on a measure of the thing, event, or characteristic.

An item of data "includes" information indicating a thing, an event, or a characteristic if data indicating the thing, event, or characteristic can be obtained by operating on the item of data. Conversely, an item of information that indicates a thing, an event, or a characteristic can be said to "include" an item of data if data indicating the thing, event, or characteristic can be obtained by operating on the item of data.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

An "image" is a pattern of physical light. An "image set" is a set of one or more images.

When an image is a pattern of physical light in the visible portion of the electromagnetic spectrum, the image can produce human perceptions. The term "graphical feature", or "feature", refers to any human perception produced by, or that could be produced by, an image.

An image "shows" a feature when the image produces, or could produce, a perception of the feature. An image set "shows" a feature when the image set includes one or more images that, separately or in combination, show the feature. An item of data "defines" a feature when the item defines an image set that shows the feature.

A "graphical representation" is a graphical feature that includes elements that are spatially related in a configuration that represents information.

An image may be divided into "segments," each of which is itself an image. A segment of an image may be of any size up to and including the whole image.

An image or image set may be analyzed into "parts," each of which is smaller than the whole image or image set. Each part includes one or more segments of the image or segments of images in the image set.

An item of data "defines" an image when the item of data includes sufficient information to produce the image. For example, a two-dimensional array can define all or any part of an image, with each item of data in the array providing a value indicating the color of a respective location of the image.

A "data image" is an item of data defining an image.

An item of data "defines" an image set when the item of data includes sufficient information to produce all the images in the set.

An image or image set "includes" information indicating a thing, an event, or a characteristic if an item of data indicating the thing, event, or characteristic can be obtained by operating on an item of data defining the image or image set.

A "data transmission" is an act that physically transmits data from one location to another. A "facsimile transmission" is a data transmission in which the transmitted data define an image set according to a standard format. An "image destination" is a machine or other destination to which data defining an image can be transmitted. A "fax machine" is a machine with circuitry that can receive and provide facsimile transmissions. Therefore, the telephone number of a fax machine is an example of information that indicates an image destination.

A "marking medium" is a physical medium on which a human can produce a pattern of marks by performing marking actions or by performing actions that modify marks, such as erasing, wiping, or scratching actions. Common examples of marking media include sheets of paper and plastic, although humans can produce patterns of marks on an enormous variety of media. As used herein, "marking medium" covers one or more distinct units of a medium on which, together, a human has produced a pattern of related marks. For example, a set of paper pages that form a handwritten letter would be a single marking medium. Also, as used herein, "marking medium" includes a marking surface of an electronic device that can sense marks, such as a tablet, a touch- or signal-sensitive display, or another pen- or stylus-based input device.

A human "marks" a marking medium or "makes a mark on" a marking medium by performing any action that produces or modifies marks on the marking medium; a human may mark a marking medium, for example, with marking, stamping, erasing, wiping, or scratching actions.

A human makes a mark "by hand" when the human holds an instrument in a hand and moves the instrument across or against the surface of a marking medium to make the mark. The instrument could, for example, be a pen, a pencil, a stylus, a dry marker, a crayon, a brush, a stamp, an eraser, and so forth.

Marks are made "by a machine under control of a human" when the human performs actions that cause the machine to make the marks. The machine could, for example, be a typewriter, a printer, a copier, a fax machine, and so forth.

A "human-produced image" is an image that shows marks made by hand by a human, by a machine under control of a human, or in some other way in which a human can provide marks.

The term "mark" includes a single mark and also plural marks that together form a pattern of marks.

A mark "indicates" a thing, an event, or a characteristic when the presence or shape of the mark depends on the existence or occurrence of the thing, event, or characteristic or on a measure of the thing, event, or characteristic. For example, a mark can indicate a boundary.

A "version" of a first image is a second image produced using an item of data defining the first image. The second image may be identical to the first image, or it may be modified by loss of resolution, by changing the data defining the first image, or by other processes that result in a modified version.

Each location in an image may be called a "pixel." In an array defining an image in which each item of data provides a value, each value indicating the color of a location may be called a "pixel value." A pixel's value in an image that is a version of another image may indicate an attribute of a region of the other image that includes the pixel.

Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used.

A "connected component" or "blob" is a set of pixels within a data array defining an image, all of which are connected to each other through an appropriate rule such as that they are neighbors of each other or are both neighbors of other members of the set. A connected component of a binary form of an image can include a connected set of pixels that have the same binary value, such as black. A "bounding box" for a connected component is a rectangle just large enough to include all the pixels in the connected component, and can be specified by coordinates.

A "constraint" on parts of images or of image sets or on features shown by images or by image sets is a requirement or other limitation that the parts or features must satisfy.

An operation uses data to "determine" whether a proposition is true if the operation uses the data to obtain other data indicating whether the proposition is true. For example, an operation can use data defining an image to determine whether parts of the image satisfy a constraint, in which case the operation will obtain data indicating whether the image includes parts that satisfy the constraint.

A criterion is an example of a constraint. If a criterion "requires" a part of an image or of an image set with a characteristic or that has a characteristic, only parts with the characteristic or that have the characteristic meet the criterion.

A first item of data is produced by "applying a criterion" to a second item of data when the first item indicates whether the second item meets the criterion. An operation that applies a criterion produces such an item of data.

A criterion can be "applied" to a connected component or other part of an image or of an image set by applying the criterion to an item of data defining the image in a manner that depends on the connected component or other part. A connected component or other part of an image or of an image set "meets a criterion" if application of the criterion to the part produces an item of data indicating that the part meets the criterion. Numerous criteria can be applied to connected components and other parts of an image or of an image set. For example, a criterion can require a connected component to enclose more pixels or less pixels than the pixels in the connected component; a criterion can require a connected component to be the connected component nearest to another connected component; or a criterion can require a connected component to have a length that is greater than its distance to another connected component.

An operation includes a "sequence of iterations" when the operation includes a sequence of substantially similar sub-operations, each referred to as an "iteration," where each iteration after the first uses starting data produced by the preceding iteration to obtain ending data. Each iteration's ending data can in turn be used by the following iteration. A "change occurs" during an iteration if the iteration's ending data is different than its starting data; an iteration during which no change occurs can be the last iteration, because no change will occur during further iterations.

A sequence of iterations "propagates" a constraint if each iteration includes an operation that determines whether items indicated by its starting data satisfy the constraint, and obtains ending data that indicates only the items that satisfy the constraint. For example, if the starting data and ending data define images, the ending data could define an image that includes only the parts of the starting image that satisfy the constraint.

An operation uses data to "determine" whether a proposition is true if the operation uses the data to obtain other data indicating whether the proposition is true. For example, an operation can use data defining an image showing a graphical feature to determine whether the graphical feature satisfies a constraint, in which case the operation will obtain data indicating whether the graphical feature satisfies the constraint.

"Image input circuitry" is circuitry for obtaining data defining images as input.

An "image input device" is a device that can receive an image and provide an item of data defining a version of the image. A "scanner" is an image input device that receives an image by a scanning operation, such as by scanning a document.

"User input circuitry" or "user interface circuitry" is circuitry for providing signals based on actions of a user. User input circuitry can receive signals from one or more "user input devices" that provide signals based on actions of a user, such as a keyboard, a mouse, a joystick, a touch screen, and so forth. The set of signals provided by user input circuitry can therefore include data indicating mouse operation, data indicating keyboard operation, and so forth. Signals from user input circuitry may include a "request" for an operation, in which case a system may perform the requested operation in response.

"Image output circuitry" is circuitry for providing data defining images as output.

An "image output device" is a device that can provide output defining an image.

A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image.

A "printer" is an image output device that provides an output image in the form of marks on a marking medium.

An "image layout" or "layout" is a combination of segments arranged within an image. Each segment of a layout is also an image.

An item of data or information indicates a "position" of a segment of a layout if the item of data or information can be used to locate the segment within the layout.

An item of data or information indicate a "source" of a segment of a layout if the item of data or information can be used to obtain an item of data defining the segment. The indicated source may be another image, which may be referred to as a "source image."

A first image "defines" a second image or "includes information defining" a second image if an item of data defining the first image can be used to obtain an item of data defining the second image.

A graphical representation "includes information indicating" a thing, an event, or a characteristic when data defining an image showing the graphical representation can be used to obtain an item of data indicating the thing, event, or characteristic. For example, a graphical representation can include information indicating sources of segments in a layout if an item of data indicating each segment's source can be obtained from the graphical representation. Or a graphical representation can include information indicating positions of segments in a layout if an item of data indicating each segment's position can be obtained from the graphical representation.

An image includes a layout "as represented by" a graphical representation of a layout if the graphical representation includes information indicating a combination of segments that occurs in the image and indicating positions of the segments that occur in the image.

A "segment representation" is a part of a graphical representation of a layout that represents a segment.

The term "content" refers to information represented by a graphical representation's configuration.

A "structure" is a graphical feature that includes other graphical features that are perceptible as interrelated.

A "node-link structure" is a structure that includes graphical features that can be distinguished into "nodes" and "links" with each link relating two nodes to each other or relating a node to itself. Examples of node-link structures include directed graphs, undirected graphs, trees, flow charts, circuit diagrams, and state-transition diagrams.

A "parallel length graph" is a graphical representation in which a number of features that are approximately parallel have lengths proportional to values they represent. The following categories of graphical representations are examples of parallel length graphs: bar graphs, histograms, Gantt charts, timing diagrams, and time lines.

A "proportioned parts graph" is a graphical representation in which a feature defines a number of segments, with each segment representing a part of a whole, and with each segment having a size that bears approximately the same proportion to the feature as the part it represents bears to the whole. The most common category of graphical representation that is an example of proportioned parts graphs is the pie chart. In one type of bar graph, referred to herein as a "whole bar graph" or "segmented bar graph," each bar is a proportioned parts graph.

A "row/column representation" is a graphical representation that includes rows and columns and represents information for row/column combinations.

The following categories of graphical representations are examples of row/column representations: tables, matrices, arrays, calendars, two-dimensional connection diagrams, puzzles such as crossword puzzles, or game diagrams such as chess or checkers diagrams, go game diagrams, or ticktacktoe games.

A "perimeter relationship representation" is a graphical representation in which perimeters represent distinctions. Each perimeter represents a distinction between items that fall within a set or category and items that fall outside the set or category. The perimeters enclose areas in a way that indicates a relationship among the distinctions they represent. One common type of perimeter relationship representations is the Venn or set membership diagram; another is an isometric map, such as a map with lines of equal elevation, equal barometric pressure, and so forth; some statecharts, organization charts, and block-structured program diagrams are perimeter relationship representations.

A "two-dimensional graph" is a graphical representation in which two parameters are represented implicitly or explicitly as orthogonal dimensions, within which each position represents a pairing of values for the parameters, and within which features are positioned to indicate relationships to pairings of values of the parameters or relationships between pairs of values of the parameters. The following categories of graphical representations are examples of two-dimensional graphs: line graphs, scatter plots, and certain kinds of maps. Many two-dimensional graphs fall into the category of "X-Y graphs," meaning a graphical representation with two perpendicular axes indicating orthogonal dimensions.

B. General Features

Figure 2:
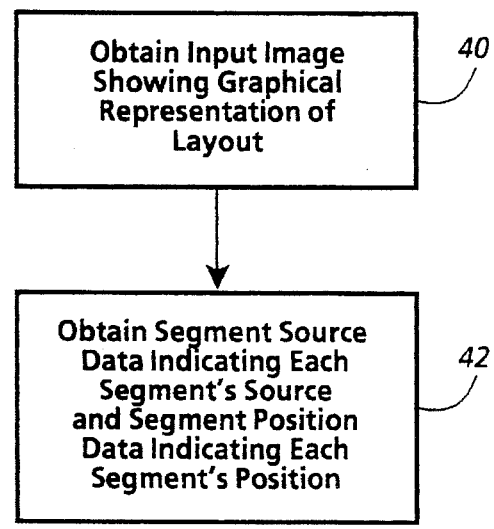
FIG. 2 is a flow chart showing general acts in analyzing an image showing a graphical representation of a layout.
Figure 3:
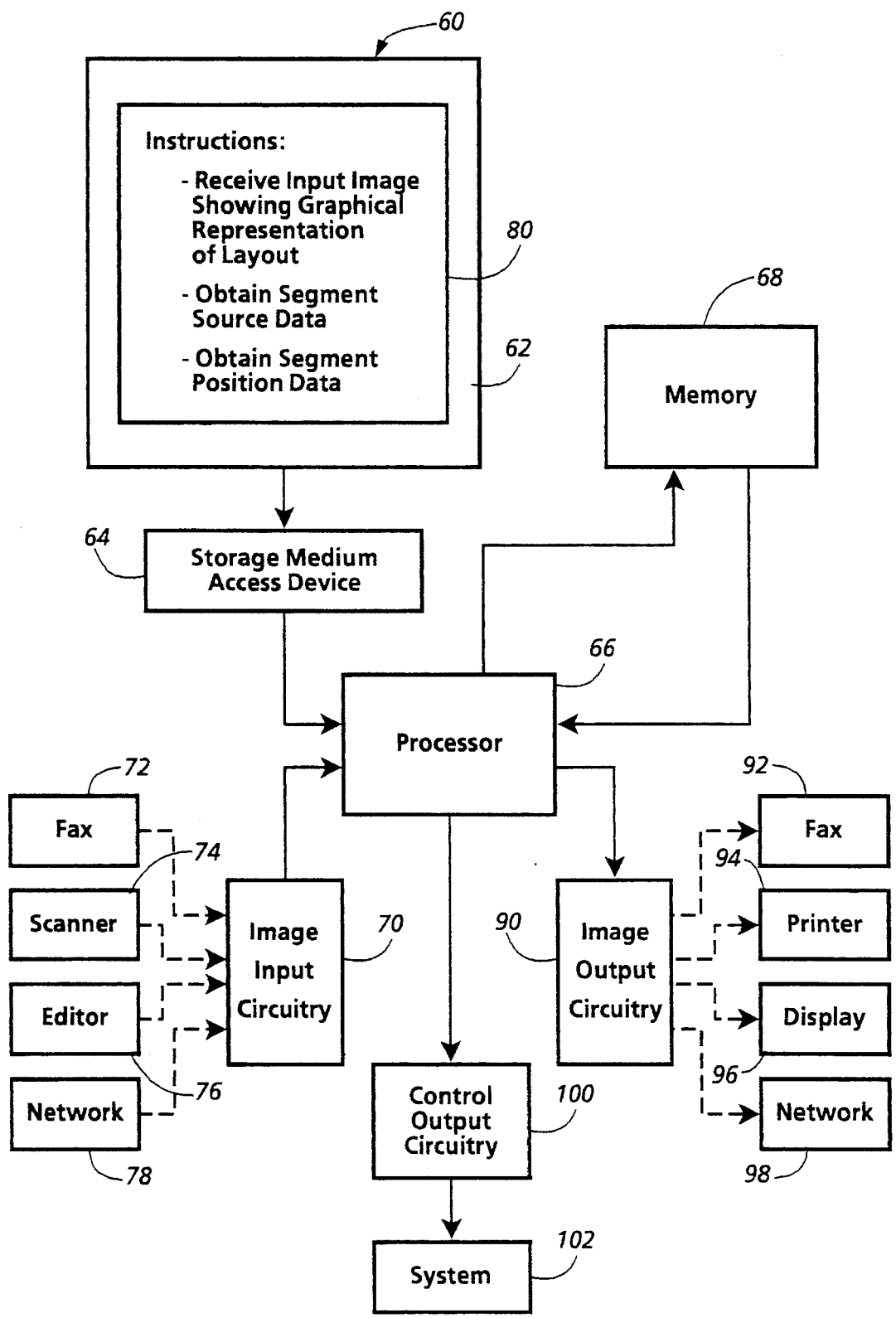
FIG. 3 is a schematic block diagram showing general components of a software product and a machine in which the software product can be used to implement the general acts in FIG. 2.

FIGS. 1–3 show general features of the invention. FIG. 1 shows schematically how an image showing a graphical representation of a layout can be analyzed. FIG. 2 shows general acts in analyzing an image showing a graphical representation of a layout. FIG. 3 shows general components of a software product and of a machine in which it can be used.

FIG. 1 shows input image 10 showing graphical representation 12 of a layout. Graphical representation 12 can, for example, be a human-produced sketch. Graphical representation 12 illustratively includes segment representations 14 and 16. Each segment representation illustratively includes a character indicating an image source, and each segment representation is positioned within graphical representation 12 to indicate a position for an image from the indicated image source. A machine receiving data defining input image 10 can respond by automatically obtaining segment source data 20 indicating a source for each segment. The machine can also respond by automatically obtaining segment position data 22 indicating a position for each segment.

The general acts in FIG. 2 begin in box 40 by receiving input image data defining an input image that shows a graphical representation of a layout. In response, the act in box 42 uses the input image data to obtain segment source data indicating a source for each segment and segment position data indicating a position for each segment.

FIG. 3 shows software product 60, an article of manufacture that can be used in a system that includes components like those shown in FIG. 3. Software product 60 includes data storage medium 62 that can be accessed by storage medium access device 64. Data storage medium 62 could, for example, be a magnetic medium such as a set of one or more tapes, diskettes, or floppy disks; an optical medium such as a set of one or more CD-ROMs; or any other appropriate medium for storing data.

Data storage medium 62 stores data that storage medium access device 64 can provide to processor 66. Processor 66 is connected for accessing memory 68, which can include program memory storing data indicating instructions that processor 66 can execute and also data memory storing data that processor 66 can access in executing the instructions.

Processor 66 is also connected for receiving data defining images from image input circuitry 70. The data could be obtained from facsimile (fax) machine 72; from scanner 74; from editor 76, which could be a forms editor or other interactive image editor controlled by user input devices such as a keyboard and mouse or a pen- or stylus-based input device; or from network 78, which could be a local area network or other network capable of transmitting data defining an image.

In addition to data storage medium 62, software product 60 includes data stored by storage medium 62. The stored data include data indicating image processing instructions 80, which processor 66 can execute to perform acts like those in FIG. 2. In executing instructions 80, processor 66 receives input image data defining an input image set from image input circuitry 70. The input image set shows a graphical representation of a layout. Processor 66 uses the input image data to obtain segment source data indicating a source for each segment and segment position data indicating a position for each segment.

Processor 66 can also be connected for providing data defining images to image output circuitry 90. For example, software product 60 could include data indicating instructions processor 66 can execute to use the segment source data and the segment position data to obtain output image data defining an output image. The output image could have a layout as represented by the graphical representation. The output image data could be provided to image output circuitry 90, and could in turn be provided to fax machine 92, to printer 94, to display 96, or to network 98.

The segment source data and the segment position data could also be used to provide control signals. For example, memory 68 could store control instructions processor 66 can execute to use the segment source data and the segment position data to obtain control data defining control signals. The control data could be provided to control output circuitry 100, which could respond by providing control signals to system 102.

Rather than being used immediately, the segment source data and the segment position data could instead be stored in memory 68 for possible future use. This would be appropriate, for example, where information indicating an operation to be performed on an input image set has not been obtained at the time data defining the input image set is received.

C. Implementation

The general features described above could be implemented in numerous ways on various machines to analyze images showing graphical representations of layouts. The implementation described below analyzes images and uses the results to control a graphic rendering system.

1. Image Showing Graphical Representation of Layout

Figure 4:
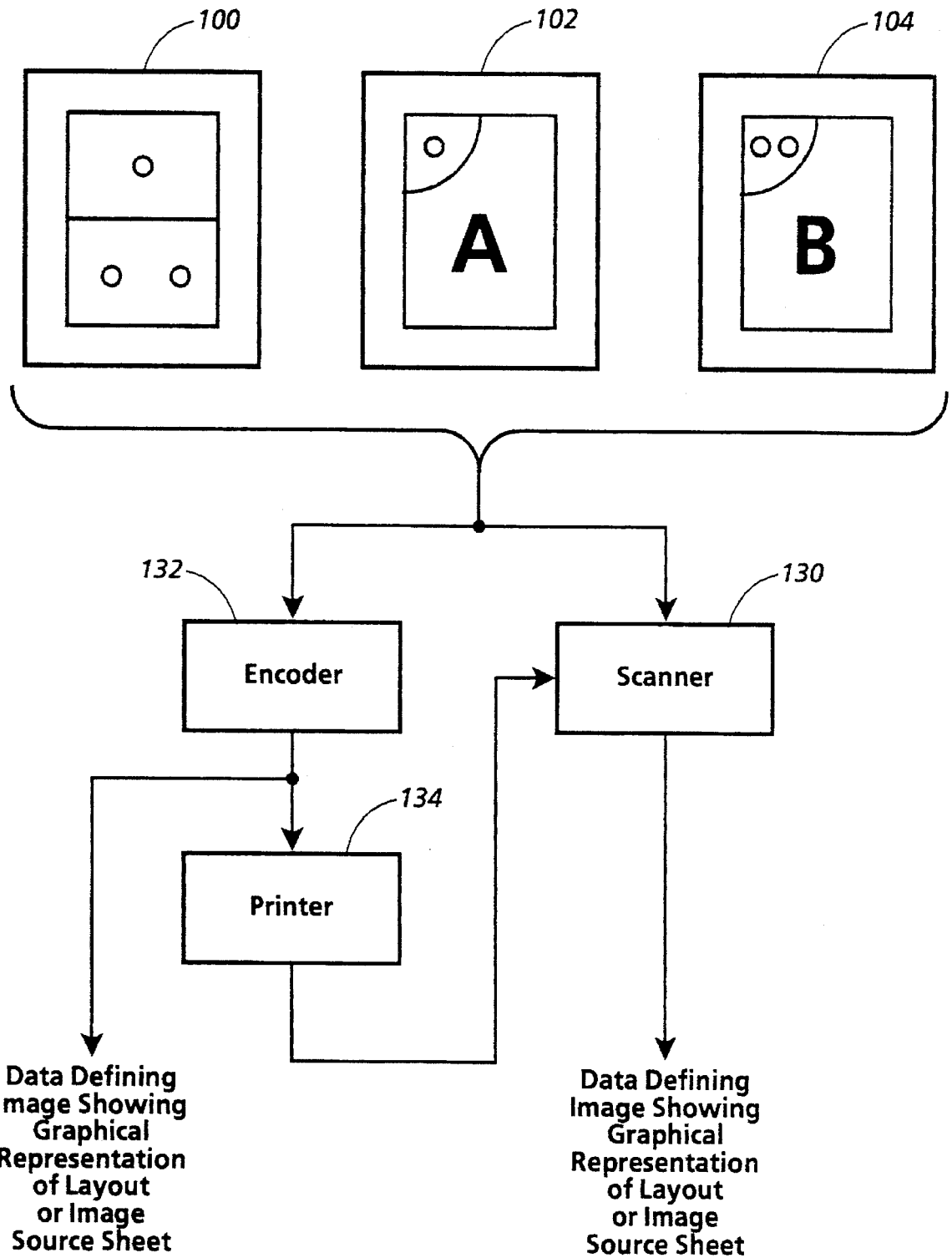
FIG. 4 is a schematic block diagram showing an image set and ways in which a user can provide data defining an image showing a graphical representation of a layout made by hand.
Figure 5:
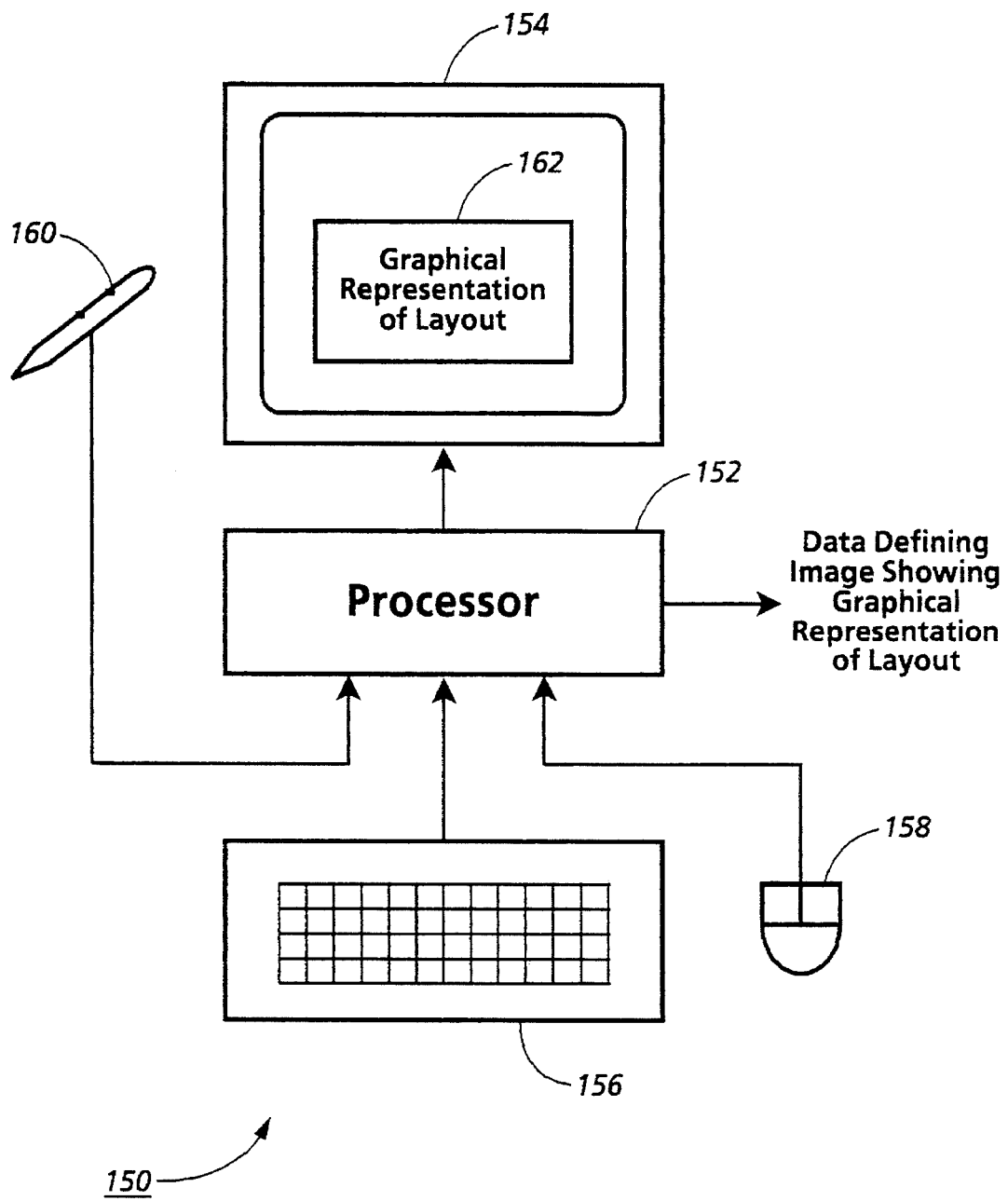
FIG. 5 is a schematic block diagram showing how a user can provide data defining an image showing a graphical representation of a layout produced interactively with a machine.

Data defining an image set showing a graphical representation of a layout can be obtained in many ways. FIG. 4 illustrates ways in which a user can provide an image showing a graphical representation of a layout made by hand. FIG. 5 illustrates ways in which a user can provide an image showing a graphical representation of a layout by interacting with a machine.

FIG. 4 shows at the top an example of an image set showing a graphical representation of a layout and two image source sheets.

Image 100 shows a graphical representation of a layout. The graphical representation includes two segment representations, one above the other and each occupying approximately half the area of the graphical representation. The upper segment representation includes one connected component, and the lower segment representation includes two.

Images 102 and 104 show image source sheets, in each of which a sketch or other marks indicating an image is enclosed by a rectangular connected component with a line separating a region at the upper left corner. In image 102, the upper left region includes one connected component, as in the upper segment representation; in image 104, the upper left region includes two, as in the lower segment representation. As discussed below, the number of connected components can be counted to obtain data indicating that image 102 includes the source for the segment represented by the upper segment representation in image 100 and image 104 includes the source for the segment represented by the lower segment representation in image 100.

Any of the images in FIG. 4 could be a human-produced sketch made by marking actions performed on a marking medium by hand. Or the images could be obtained in any other appropriate way.

If the marking medium is a sheet, scanner 130 can receive the sheet. Scanner 130 operates on the sheet to provide data defining an image showing a graphical representation of a layout or showing an image source sheet.

If the marking medium is a marking surface of an electronic device that can sense marks, encoder 132 can receive signals from the electronic device and use the signals to obtain data defining an image showing a graphical representation of a layout or showing an image source sheet. This data can then be provided to printer 134 to obtain a sheet on which marks are printed, and this sheet can be provided to scanner 130. Scanner 130 provides data defining an image showing a graphical representation of a layout or showing an image source sheet.

FIG. 4 also shows that data from encoder 132 could be used directly as data defining an image showing a graphical representation of a layout or showing an image source sheet. This would be appropriate if encoder 132 could provide data defining an image in response to marking actions.

FIG. 5 shows machine 150, which could be a personal computer, a workstation, or another data processing system. Machine 150 includes processor 152; display 154; keyboard 156; pointing device 158, illustratively a mouse; and screen position indicating device 160, illustratively a stylus. A user can operate keyboard 156 and pointing device 158 to provide signals to processor 152. Or a user can perform marking actions with screen position indicating device 160 on the surface of display 154 to provide signals to processor 152. In response, processor 152 presents and modifies image 162 on display 154, so that the user can continue to provide signals until image 162 shows a desired graphical representation of a layout. Then the user can provide a signal requesting that processor 152 provide data defining image 162.

Processor 152 could execute a number of types of software to permit a user to produce an image in the manner described above. Processor 152 could execute document editing software or image editing software, for example.

In implementing the general features described above, an image set showing a graphical representation of a layout could be produced in any of the ways shown in FIGS. 4 and 5 or in any other appropriate way.

2. System

Figure 6:
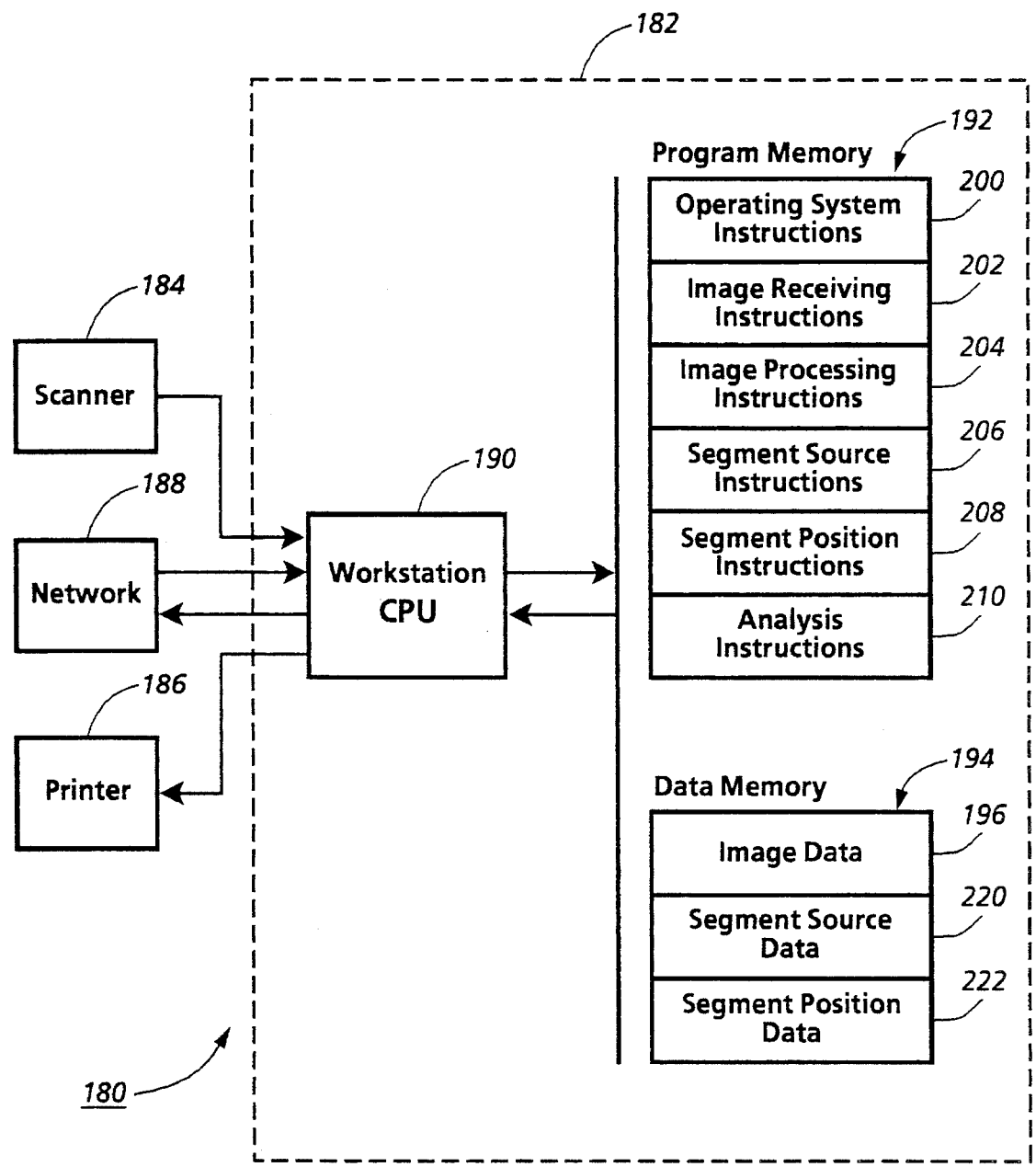
FIG. 6 is a schematic block diagram of a machine that can analyze an image showing a graphical representation of a layout.

FIG. 6 shows a system in which the general features described above have been implemented.

System 180 in FIG. 6 includes workstation 182, a Sun SPARCStation 10 workstation. Scanner 184 can be a conventional scanner such as a Xerox Datacopy GS Plus scanner. Printer 186 can be a conventional printer such as a Xerox laser printer. Network 188 can be a conventional network operating in accordance with a standard protocol, such as the Ethernet protocol.

Workstation CPU 190 is connected to receive data from scanner 184 and network 188 and is connected to provide data to printer 186 and network 188. For example, CPU 190 can receive data defining an image showing a graphical representation of a layout from scanner 154 as described above in relation to FIG. 4. Similarly, CPU 190 can receive data defining an image obtained in the manner described above in relation to FIG. 5 from network 188. In addition, workstation CPU 190 is connected to access program memory 192 and data memory 194 and other conventional workstation peripherals (not shown). Data memory 194 is illustratively storing image data 196 defining an image set showing a graphical representation of a layout.

Program memory 192 stores instructions CPU 190 can execute to perform operations implementing the general acts in FIG. 2. CPU 190 executes operating system instructions 200 that provide a Unix operating system or other appropriate operating system. Each of the other sets of instructions stored by program memory 192 can be obtained from source code in a conventional programming language such as Lisp, C, or the like with conventional compiler or interpreter techniques. When executed, these other instructions make calls to operating system instructions 200 in a conventional manner. In general, the instructions can be obtained from source code in a conventional programming language such as Lisp, C, or the like with conventional compiler or interpreter techniques that produce object code. A machine can store data indicating the source code or the resulting object code on a data storage medium in manufacturing a software product as described above in relation to FIG. 3, with the source code or object code being stored for access by a storage medium access device when the software product is used in a machine like system 180.

In executing image receiving instructions 202, CPU 190 receives data defining an image set and stores it in data memory 194, as illustrated by image data 196. The data defining the image set may be received from scanner 184 or network 188.

In executing image processing instructions 204, CPU 190 calls segment source instructions 206 and segment position instructions 208. Image processing instructions 204 also perform other operations relating to analysis of graphical representations of layouts.

In executing segment source instructions 206, CPU 190 calls analysis instructions 210 to perform basic geometric analysis of the image set defined by image data 196, producing segment source data 220. Segment source data 220 indicate a source for each segment represented in the graphical representation shown by the image set.

Similarly, in executing segment position instructions 208, CPU 190 calls analysis instructions 210 to perform basic geometric analysis of the image set defined by image data 196, producing segment position data 222. Segment position data 222 indicate a position for each segment.

3. Layout Analysis

Figure 7:
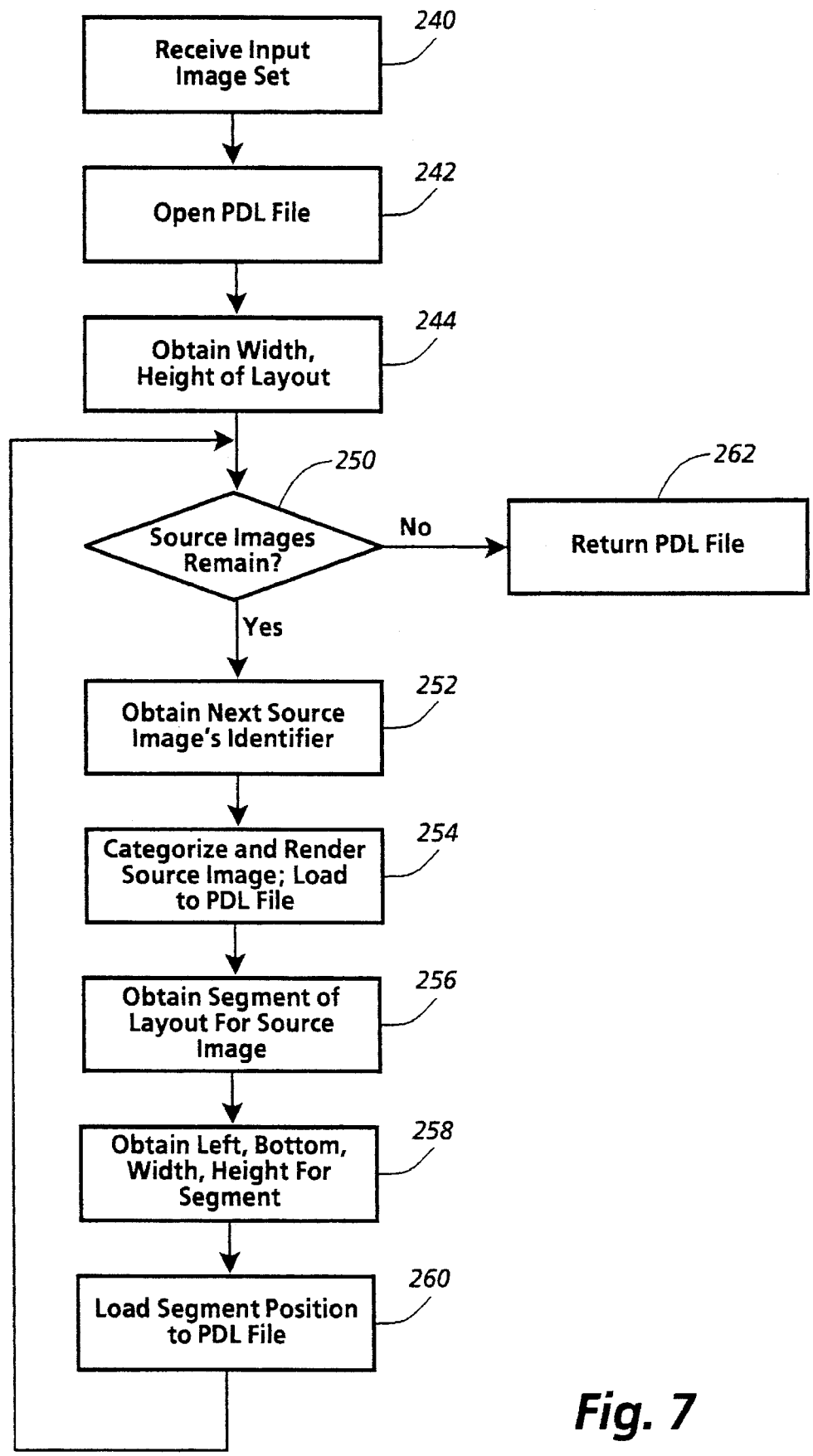
FIG. 7 is a flow chart of acts performed by the machine of FIG. 6.

FIG. 7 shows acts in executing image processing instructions 204 in FIG. 6.

Figure 8:
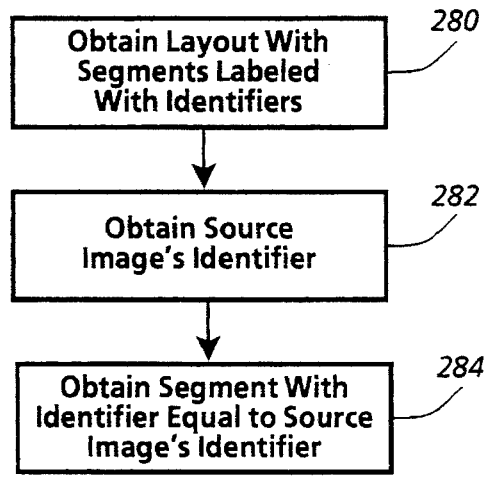
FIG. 8 is a flow chart showing how a data image showing a segment of a layout can be obtained in FIG. 7.

FIG. 8 shows acts in executing segment source instructions 206 in FIG. 6.

Figure 9:
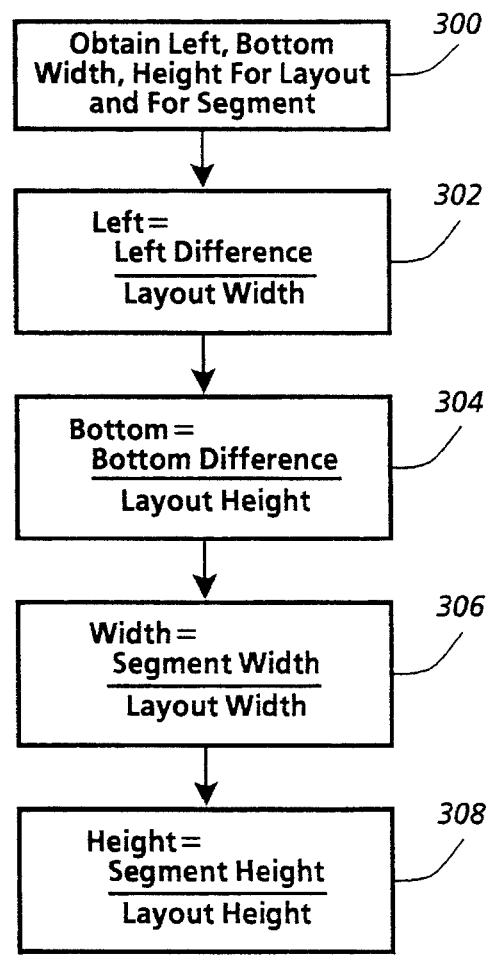
FIG. 9 is a flow chart showing how segment position data can be obtained in FIG. 7.

FIG. 9 shows acts in executing segment position proportions instructions 208 in FIG. 6.

Many of the acts in FIGS. 7–9 are performed on items of data, each of which defines an image. Each item is referred to as a "data image." Some data images can be used in obtaining others. In general, all of the data images define images with the same number of pixels, and each operation produces an image with the same number of pixels. An operation on two images typically uses values of pairs of pixels to produce, for each pair, a pixel value in an image being produced; within each pair, one pixel is from each image and the two pixels in the pair are both at the same location as the pixel value in the image being produced. Many examples of such operations are described in copending, coassigned U.S. patent application Ser. No. 08/157,600, entitled "Analyzing an Image Showing a Node-Link Structure" ("the Node-Link Structure Application"), and in copending, coassigned U.S. patent application Ser. No. 08/157,804, entitled "Analyzing an Image Showing Editing Marks to Obtain Category of Editing Operation" ("the Editing Application"), both of which are incorporated herein by reference.

The act in box 240 in FIG. 7 begins by receiving data defining an input image set. The input image data may have been received previously by executing image receiving instructions 202, and may be provided with a call to image processing instructions 204. The call can indicate layout image data defining an image showing a graphical representation of a layout and source image data defining one or more source images that show marks indicating information about image sources for segments of the layout.

The act in box 242 prepares by opening a page description language (PDL) file, such as a PostScript file.

The act in box 244 uses the layout image data to obtain data indicating the width and height of the layout. This can be done by first obtaining the difference between the x coordinates of the leftmost and rightmost ON pixels in the graphical representation and the difference between the y coordinates of the topmost and bottommost ON pixels in the graphical representation. The width can be set to a constant value of 8.5 and the height can be set to the product of 8.5 times the ratio of the height to the width. The height can be loaded into the PDL file, if appropriate.

The act in box 250 then begins an iterative loop that handles each of the source images defined by the source image data.

The act in box 252 begins each iteration by using data defining the next source image to obtain data indicating the source identifier, which can be a count of connected components. The source identifier is obtained at this point to provide a file name within the PDL file.

For source images as illustrated in images 102 and 104 in FIG. 4, the act in box 252 can be implemented by obtaining a holes data image as described in relation to FIG. 7 of the Node-Link Structure Application, then using the holes data image to obtain a filled data image as also described in relation to FIG. 7 of the Node-Link Structure Application. The act in box 252 can use the filled data image to obtain a top left component data image in which each pixel in the top left component in the filled data image is ON. The act in box 252 can AND the top left component data image with the source image to obtain a source identifier data image showing the connected components in the top left subregion of the source image. The act in box 252 can then count the connected components in the source identifier data image to obtain the source identifier.

The act in box 252 could obtain the top left component data image by first obtaining a distances data image in which each pixel is labeled with its distance from the top left corner of the image. The act in box 252 can then perform a spread operation as described in relation to FIG. 7 of the Node-Link Structure Application to obtain a top left distances data image in which each pixel in each connected component in the filled data image is labeled with the minimum distance from the distances data image of the pixels in the connected component. The act in box 252 can perform an operation to find the minimum distance of the pixels in the top left distances data image, and this minimum distance can be compared with the label of each pixel in the top left distances data image to obtain the top left component data image.

The act in box 252 could alternatively obtain the top left component data image using a seed data image in which only the top left pixel is ON. The act in box 252 could obtain a neighbor identifier data image in which each pixel is labeled with a unique identifier of a near connected component in the filled data image, using a read operation as described in relation to FIG. 7 of the Node-Link Structure Application. The act in box 252 could then perform a spread operation as described in relation to FIG. 7 of the Node-Link Structure Application to obtain a labeled data image in which each pixel has the maximum value from the seed data image of pixels that have the same value in the neighbor identifier data image. The act in box 252 can then AND the labeled data image with the filled data image to obtain the top left component data image.

The act in box 254 then categorizes the contents of the source image and obtains data indicating a rendered version of the source image. The act in box 254 then loads the rendered version into the PDL file opened in box 242 using the file name from box 252.

The act in box 254 can be implemented by obtaining a bottom right component data image similar to the top left component data image described in relation to box 252 above. Then the act in box 254 can use the bottom right component data image to obtain a rendered image in the manner described in copending, coassigned U.S. patent application Ser. No. 08/158,063, entitled "Using a Category to Analyze an Image Showing a Graphical Representation" ("the Categorizing Application"), incorporated herein by reference. As described in relation to FIGS. 6–8 of the Categorizing Application, several categories of graphical representations can be categorized and rendered. Significant categories include node-link structures, parallel length graphs, proportioned parts graphs, row/column representations, perimeter relationship representations and two-dimensional graphs. If a source image is not an instance of a category that can be rendered, the source image can be rendered as a rectangular bitmap shaped in the same proportions as a bounding box around the ON pixels in the bottom right component data image.

The act in box 256 uses the source identifier from box 252 to obtain a segment source data image showing the segment of the graphical representation whose source is the source image. The act in box 256 can be implemented as described below in relation to FIG. 8.

The act in box 258 uses the segment source data image from box 256 to obtain segment position data indicating the left x coordinate, the right y coordinate, the width, and the height of the segment in the layout. The act in box 258 can be implemented as described below in relation to FIG. 9.

The act in box 260 loads the segment position data from box 258 into the PDL file opened in box 242 using the file name from box 252. When all of the source images have been handled, the PDL file is closed and returned in box 262. The PDL file can then be provided to a printer for printing, for example.

In FIG. 8, the act in box 280 uses the layout image data from box 240 in FIG. 7 to obtain a data image in which each pixel in each segment of the layout is labeled with a segment identifier.

The act in box 280 can be implemented by using the layout image data to obtain an internals data image as described in relation to FIG. 7 of the Node-Link Structure Application, and can use the internals data image to obtain a shrink data image in which only one pixel in each connected component in the internals data image is ON, as described in relation to FIG. 7 of the Node-Link Structure Application. The act in box 280 can also use the layout image data to obtain a holes data image, which can in turn be used to obtain a holes data image as described above in relation to box 252 in FIG. 7. The act in box 280 can then use the shrink data image and the filled data image to perform a spread operation as described in relation to FIG. 7 of the Node-Link Structure Application, obtaining a segment identifier data image in which each pixel in each connected component in the filled data image is labeled with the sum of the number of ON pixels in the shrink data image that are in the connected component.

The act in box 282 obtains data indicating the source image's identifier. The act in box 282 can be implemented as described above in relation to box 252 in FIG. 7.

The act in box 284 can then, at each pixel, compare the source image's identifier from box 282 with the value in the segment identifier data image from box 280, obtaining a segment data image in which each pixel is ON if its value in the segment identifier data image is equal to the source image's identifier. The segment data image therefore shows one of the segments of the layout.

The segment data image is segment source data because it indicates that the source of the image for the segment shown is the source image being handled by the iterative loop of FIG. 7.

In FIG. 9, the act in box 300 uses the layout image data from box 240 in FIG. 7 and the segment data image from box 284 in FIG. 8 to obtain four values for each image—left x coordinate, bottom y coordinate, width, and height. The act in box 300 can be implemented as described above in relation to box 244 in FIG. 7.

The acts in boxes 302, 304, 306, and 308 then obtain four similar values that together indicate the position of the segment in the layout. The left and bottom coordinates indicate a reference point and the width and height indicate the extent of the segment from the reference point rightward and upward.

The act in box 302 obtains the left x coordinate by obtaining the difference between the left x coordinates of the layout and the segment from box 300, then dividing the difference by the layout width from box 300.

The act in box 304 obtains the bottom y coordinate by obtaining the difference between the bottom y coordinates of the layout and the segment from box 300, then dividing the difference by the layout height from box 300.

The act in box 306 obtains the width by dividing the segment width from box 300 by the layout width from box 300.

The act in box 308 obtains the height by dividing the segment height from box 300 by the layout height from box 300.

The values from boxes 302, 304, 306, and 308 are loaded as segment position data as described above in relation to box 260 in FIG. 7.

4. Example

Figure 10:
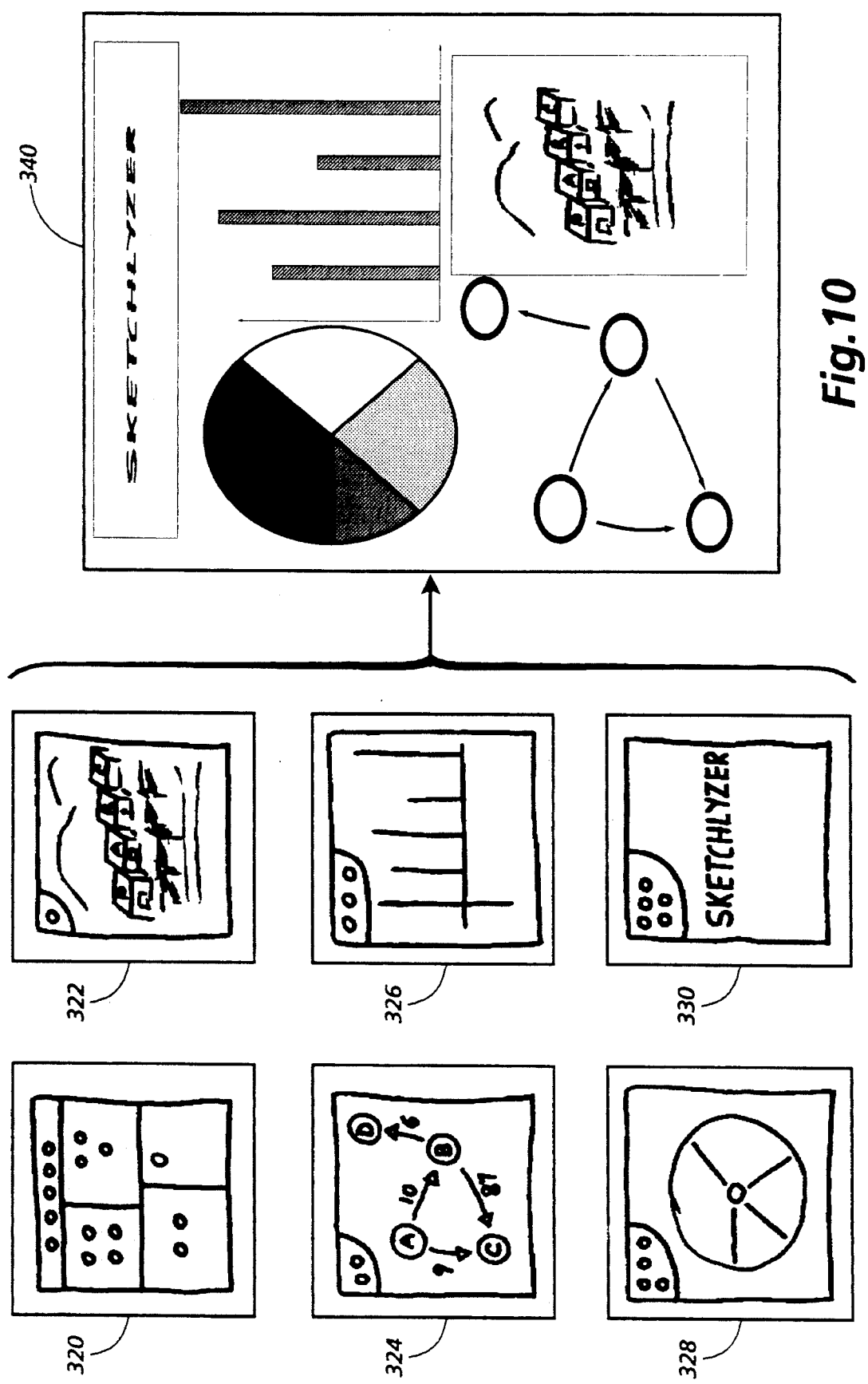
FIG. 10 shows an example of an image set showing a graphical representation of a layout and a layout obtained using techniques shown in FIGS. 6–9.

After a PDL file is obtained as described above, it can be provided to a printer or other image output device. FIG. 10 shows an example obtained with the implementation described above.

Input images 320, 322, 324, 326, 328, and 330 in FIG. 10 together form an input image set.

Input image 320 shows a graphical representation of a layout with five image segments. Input images 322, 324, 326, 328, and 330 show five source images for the five image segments. Images 322 and 330 show source images that cannot be rendered by the current implementation. Image 324 shows a sketch of a node-link structure that can be rendered as described in the Node-Link Structure Application. Image 326 shows a sketch of a parallel length graph that can be rendered as described in copending, coassigned U.S. patent application Ser. No. 08/158,062, entitled "Analyzing an Image Showing a Parallel Length Graph," incorporated herein by reference. Image 328 shows a sketch of a proportioned parts graph that can be rendered as described in copending, coassigned U.S. patent application Ser. No. 08/157,856, entitled "Analyzing an Image Showing a Proportioned Parts Graph," incorporated herein by reference.

Output image 340 shows a resulting layout with five image segments as represented by the graphical representation in image 320. Source images 324, 326, and 328 have been categorized and rendered as precisely formed images showing, respectively, a directed graph, a vertical bar graph, and a pie chart. All of the source images have been positioned and scaled according to their positions in the layout.

5. Variations

The implementation described above uses particular operations described above to obtain segment source data, segment position data, and other data from an image set showing a graphical representation of a layout and showing source images. Numerous other combinations of operations besides those described above could be used to obtain such data.

In the implementation described above, an input image set is provided so that a layout image is separate from source images. A layout image could be provided that can be automatically categorized similar to the manner in which other graphical representations are categorized as described in the Categorizing Application, making it possible to provide the layout image and the source images together in any order.

In the implementation described above, each segment of the layout has a source image in the input image set. One or more of the source images could instead be retrieved from memory or elsewhere using an address or other information from an input image set.

The implementation described above uses a graphical representation of a layout that includes a rectangle subdivided by lines. Other graphical representations of layouts could be used.

The implementation described above uses source identifiers and segment identifiers that are numbers of connected components within segment representations. For example, the identifiers could be alphanumeric characters, if satisfactory character recognition techniques were available. Or the identifiers could be other distinguishable marks. Further, identifiers need not be positioned within the segment representations, but could be positioned outside the layout, with lines connecting them to their respective segment representations.

The implementation described above uses several sheets, one sheet bearing a sketch of a layout and each other sheet showing an image source. The number of sheets might be reduced by drawing lines connecting each segment in the layout to an image representation on the same page but outside the layout. Each image representation could, for example, include a segment identifier or could include a sketch of a graphical representation to be categorized and rendered to provide a source image.

The implementation described above analyzes each source image to obtain a source identifier from the top left and the information indicating a source image from the lower right. The source identifier and information indicating a source image could be included in a source image in other ways.

The implementation describes above allows for categorizing and rendering a sketch of a graphical representation to obtain a precisely formed graphical representation for a segment. Other categories of graphical representations could be handled, some of which are described in the Categorizing Application. In addition, text or other non-graphical representations could be handled in a different way. For example, rather than scaling text directly as illustrated by the topmost segment in image 340 in FIG. 10, text could be scaled and rearranged or rejustified to fit a segment using techniques as described in copending, coassigned U.S. patent application Nos. 07/933,422, entitled "Automatically Changing Text Characteristics by Repositioning Word Images," and 07/933,426, entitled "Automatic Image Creation by Merging Text Image and Form Image," both incorporated herein by reference.

The implementations described above can operate on human-produced images showing graphical representations that satisfy certain constraints. A machine could be implemented to produce images satisfying the same constraints automatically, in which case the implementations could be applied to machine-produced imaged.

The implementation described above handles certain operations in a component-serial fashion, obtaining terminations or distances for each connected component separately and then combining the results. Most other operations are handled in component-parallel fashion. The mix of component-serial and component-parallel operations could be varied in any appropriate way; all operations could be component-parallel, all could be component-serial, or some could be component-parallel and others component-serial.

The implementation described above uses currently available image processing techniques, but could readily be modified to use newly discovered image processing techniques as they become available. For example, component-parallel techniques for obtaining terminations and distances between connected components might be used instead of component-serial techniques; the component-parallel techniques might use Voronoi boundaries or Voronoi regions, for example, spreading minimum distances from locations on a Voronoi boundary.

The implementation described above operates on binary images, but could be extended to operate on color or gray scale images, either directly or after binarization.

The implementation described above uses the results of image analysis to control rendering, but image analysis results could be used for a variety of other purposes. For example, the results of image analysis could be stored to preserve a graphical representation generated during a meeting using a tool such as a computer-controlled whiteboard device, for which user interface techniques are described in copending, coassigned U.S. patent application Ser. Nos. 07/869,554, now continued as 08/394,909, entitled "Generalized Wiping as a User Interface for Object-Based Graphical Displays," and 07/869,559, now issued as U.S. Pat. No. 5,404,439, "Time-Space Object Containment for Graphical User Interface," both incorporated herein by reference.

The rendering back end of the implementation described above is based on a collection of PostScript code fragment templates, made interactively using the IDRAW program in the X window system. Examples of such code fragments include code to draw axes of an X-Y graph and code to draw a bar in a bar chart. Parameters of a graphical representation are automatically inserted into a PostScript code fragment template, and data defining an output image with a more precise version of the graphical representation is obtained by invoking a sequence of PostScript code fragments according to the structure of a category that applies to the graphical representation. This approach is compatible with many PostScript-based drawing/rendering programs. To make an interface to a new drawing system, one would simply perform interactive operations to obtain a collection of PostScript code fragment template files.

One of the advantages of the implementation described above is that the user can draw a relatively simple sketch to indicate a relatively complicated graphical representation that can be rendered automatically in response to the sketch. Therefore, the sketch cannot specify all the relevant parameters of the output image, making it necessary for parameters that are not specified to default sensibly. In the implementation described above, default parameters are supplied by rendering procedures. A user could instead provide defaults, such as in an initialization file. Defaults could be provided for specific categories and for specific rendering systems.

The implementation described above performs acts in a specific order that could instead be performed in another order. In FIG. 7, for example, a source image could be categorized, rendered, and loaded to a PDL file after rather than before segment source data is obtained and segment position data is obtained and loaded. In FIG. 8, a source image's identifier could be obtained before rather than after obtaining a layout with segments labeled with identifiers. In FIG. 9, the values could be obtained in any order.

The implementation described above prepares one layout from an input image set. In addition, a layout could be reorganized by providing a graphical representation of a new layout, mapping the regions of the previous layout to the new layout. Also, a layout could be incrementally modified using a markup technique to indicate a segment of the layout and an operation such as a geometric transformation to be performed on the indicated segment. For this purpose, editing techniques could be used as described in copending, coassigned U.S. patent application Ser. No. 08/157,804, entitled "Analyzing an Image Showing Editing Marks to Obtain Category of Editing Operation," incorporated herein by reference.

In the implementation described above, a graphical representation of a layout is provided on a sheet with no other information. The same sheet could, however, include other information about a layout operation, such as output file, rendering system, and so forth.

Figure 11:
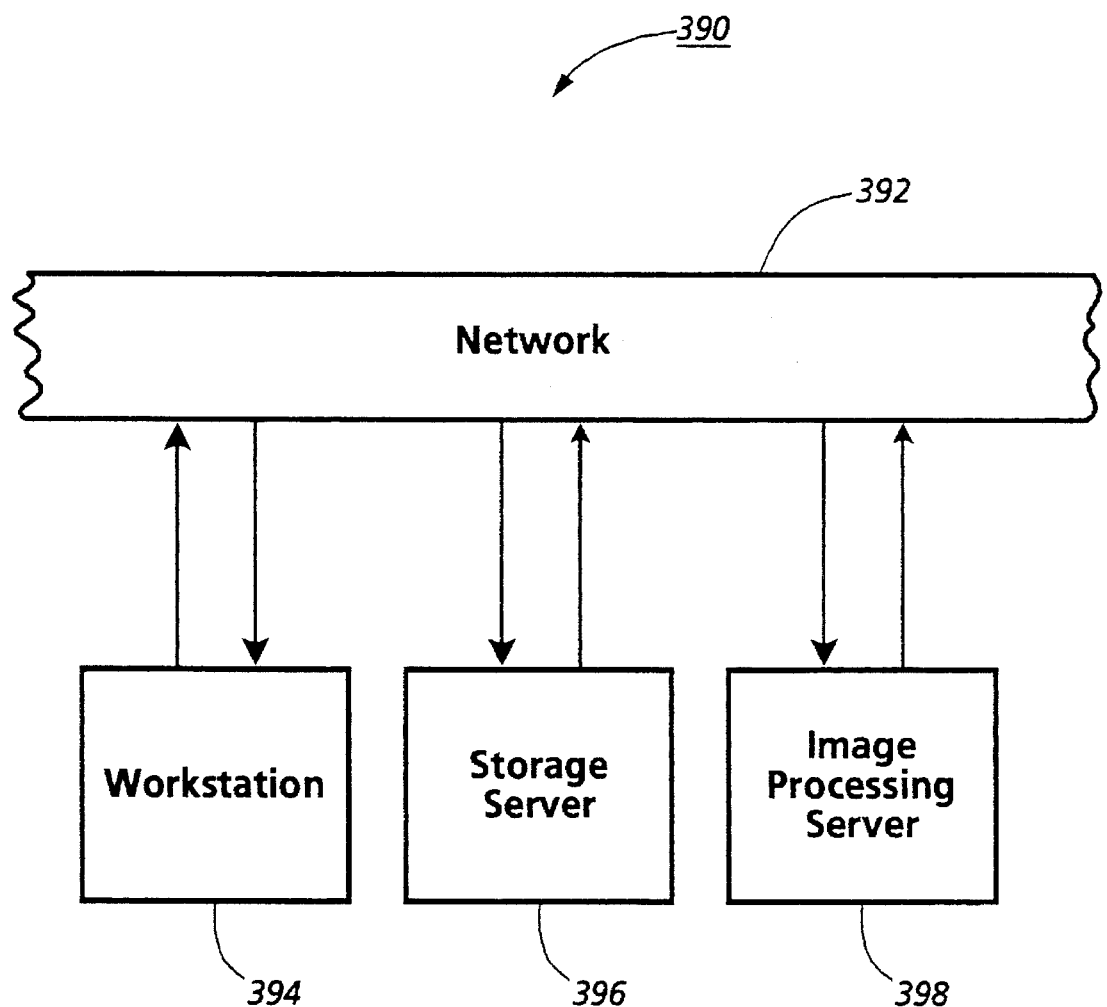
FIG. 11 is a schematic block diagram of an implementation with an image processing server.

The implementation described above in relation to FIG. 6 employs a workstation CPU that executes image processing instructions. FIG. 11 shows an alternative implementation that uses an image processing server. This implementation can provide the usual advantages of server architectures, including economy, speed, and sharing of resources.

System 390 in FIG. 11 includes network 392, workstation 394, storage server 396, and image processing server 398. A user can operate workstation 394 to provide requests on network 392 for storage of data defining images, such as from a scanner or other source. In response, storage server 396 can store the data. Then, the user can operate workstation 394 to provide requests for image processing operations like those described above. In response, image processing server 388 can perform the requested operations, executing instructions like those described above in relation to FIG. 6.

D. Application

Figure 12:
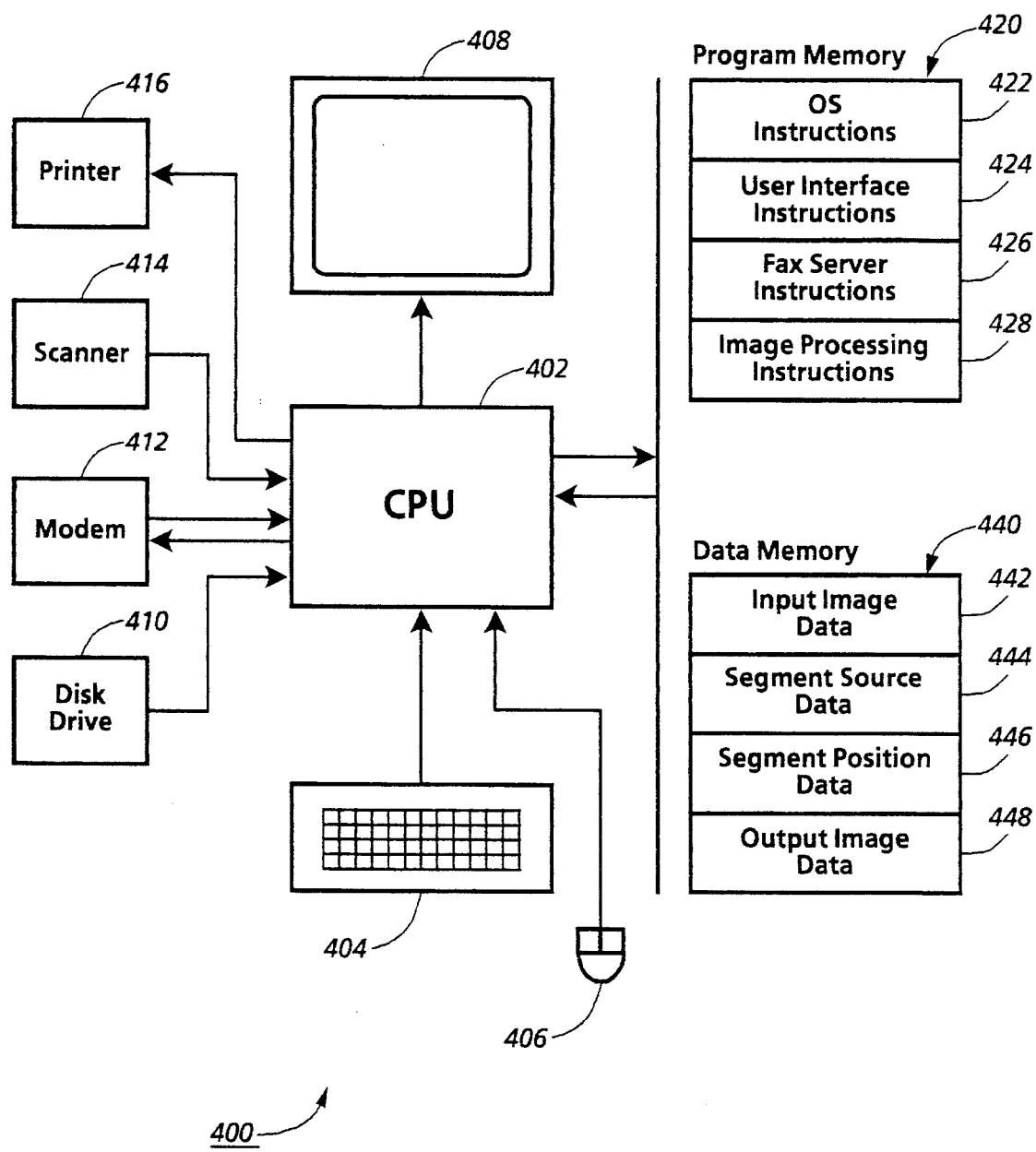
FIG. 12 is a schematic block diagram of a fax server application.
Figure 13:
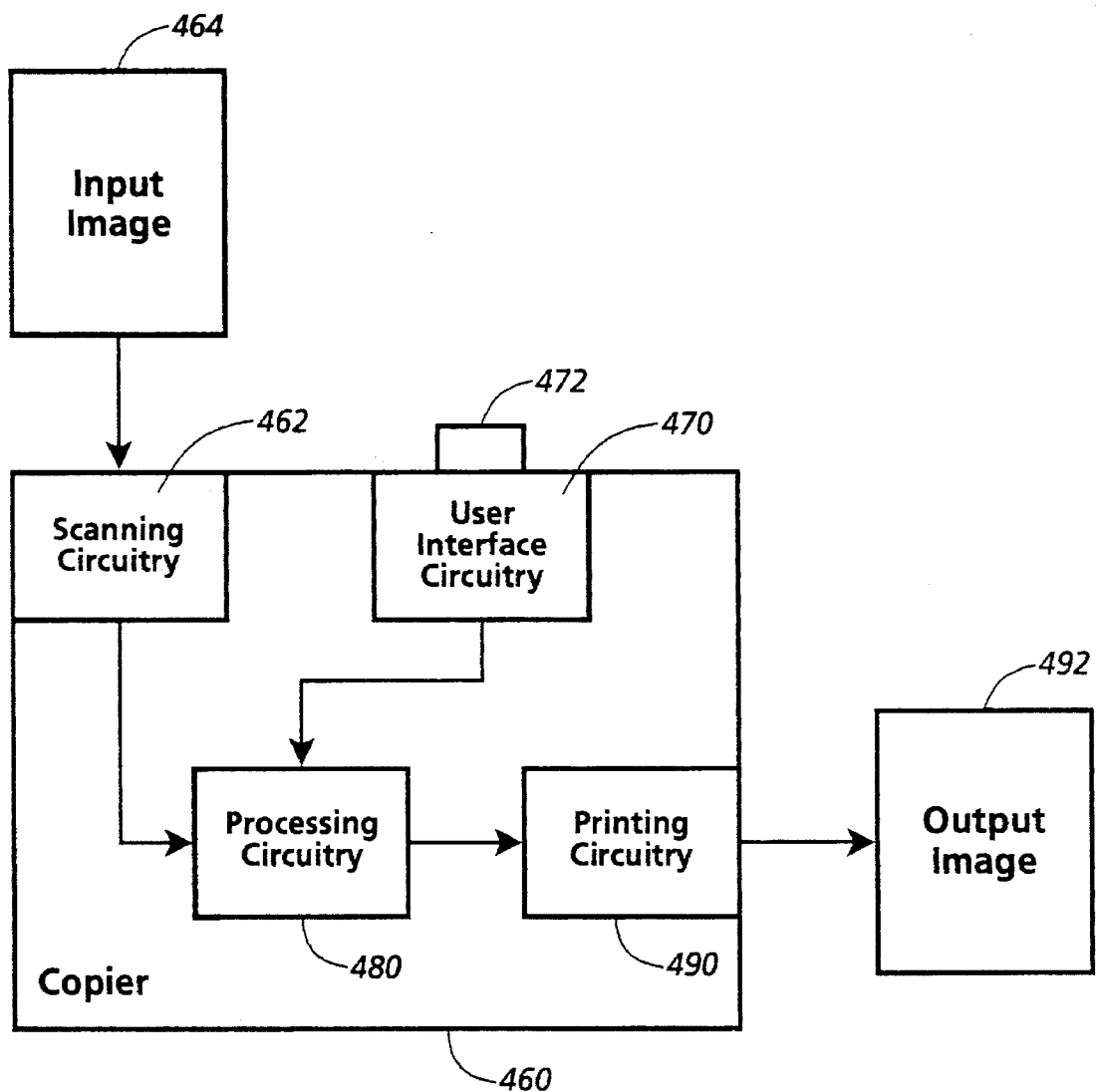
FIG. 13 is a schematic block diagram of a copier application.

The invention could be applied in many ways. In general, the techniques described above can be used to rapidly assemble a nicely-rendered graphic document based on hand-drawn sketches of the document's layout and the segments of the layout. In this way, one could generate slides for a talk or experiment with the layout of a poster or an illustration page of a paper. Or one could assemble items drawn from various reference materials in a library with one's own diagrammatic and textual notes to obtain a summary of one's research. FIG. 12 shows how the techniques described above could be applied in a personal computer that can operate as a fax server. FIG. 13 illustrates how the techniques described above could be applied in a copier.

System 400 in FIG. 12 includes CPU 402, which can be the CPU of a personal computer such as an IBM PC compatible machine. CPU 402 is connected to receive user input signals from keyboard 404 and mouse 406, and can present images to a user through display 408. CPU 402 is also connected to a number of other peripheral devices, illustratively including disk drive 410, modem 412, scanner 414, and printer 416.

Program memory 420 stores operating system (OS) instructions 422, which can be a version of DOS; user interface instructions 424; fax server instructions 426; and image processing instructions 428. Fax server instructions 426 can be similar to the PaperWorks™ software product described in copending, coassigned U.S. patent application Ser. No. 08/096,198, entitled "Data Access Based on Human-Produced Images," incorporated herein by reference. Image processing instructions 428 can be implemented as described above in relation to image processing instructions 204 in FIG. 6 and in relation to FIGS. 7–9. Fax server instructions 426 and image processing instructions 428 could be obtained in the form of a software product stored on a floppy disk, diskette, or CD-ROM, and accessed for storage in program memory 420 by disk drive 410.

Data memory 440 stores input image data 442, segment source data 444, segment position data 446, and output image data 448 as described above in relation to FIGS. 6–9.

System 400 can obtain input image data 442 defining an image set that shows a graphical representation of a layout in many ways: Data defining an image showing a graphical representation of a layout could be produced interactively as described above in relation to FIG. 5, such as by executing user interface instructions 424. Any appropriate user interface techniques could be used, including pen-based techniques. Data defining a previously produced image showing a graphical representation of a layout could be retrieved from a storage medium by disk drive 410. Data defining an image showing a graphical representation of a layout could be obtained from scanner 414 as described above in relation to FIG. 4. A user could produce data defining an image showing a graphical representation of a layout elsewhere and provide it to system 400 through modem 412, such as by making a facsimile transmission to modem 412.

CPU 402 could execute fax server instructions 426 in response to a request received by facsimile transmission through modem 412. The request could include a form indicating a layout operation and also indicating an output image destination such as a fax machine or printer 416. The request could also include data defining an image showing a graphical representation of a layout or could indicate an image previously obtained by system 400.

Fax server instructions 426 could include calls to image processing instructions 428 to perform acts like those shown in FIGS. 7–9 if the request indicates a layout operation. Execution of fax server instructions 426 could further provide data defining an output image showing a layout as represented by the graphical representation, which could be provided to modem 412 for facsimile transmission or to printer 416 for printing.

The implementations described above are especially well suited to offline sketch analysis as in FIG. 12 because speed of analysis matters less for offline analysis than it would for online analysis. Also, reliability may matter more for offline analysis than it would for online analysis. As illustrated in FIG. 13, however, the implementations described above may also be applied in online analysis, such as in a copier.

In FIG. 13, copier 460 can be a digital copier or other electronic reprographics system. Scanning circuitry 462 obtains data defining input image 464 showing a graphical representation of a layout. User interface circuitry 470 includes touch sensing device 472, which can be a push button, a heat or pressure sensitive element, a capacitance sensing element, or other device for sensing a touching action. When a user touches device 472, user interface circuitry 470 provides touch data indicating that device 472 has been touched.

Processing circuitry 480 uses the touch data to obtain request data indicating a request for a layout operation. Then, responding to the request, processing circuitry 480 uses data defining input image 464 to automatically obtain segment source data indicating each segment's source and segment position data indicating each segment's position. Processing circuitry 480 then uses the segment source data and the segment position data to obtain data defining an output image that shows a layout with segments from the indicated sources at the indicated positions. This data is provided to printing circuitry 490 for printing of output image 492.

E. Miscellaneous

The invention has been described in relation to implementations that analyze images showing human-produced sketches. The invention might also be implemented to analyze other types of images, by using appropriate operations to use data defining an image showing a graphical representation of a layout to obtain data indicating segment sources and segment positions.

The invention has been described in relation to applications in which segment source data and segment position data are used to obtain data defining an output image. The invention might also be implemented to store segment source data and segment position data or to use segment source data and segment position data for other purposes, such as to provide control signals.

The invention has been described in relation to software implementations, but the invention might be implemented with specialized hardware.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method comprising:

obtaining input image data defining an input image set that shows a graphical representation of a layout that includes two or more segments; the graphical representation including segment source information indicating sources of the segments in the layout and segment position information indicating positions of the segments within the layout; the segment source information including, for a first one of the segments, segment identifier marks indicating a segment identifier identifying the first segment; and using the input image data to obtain segment source data indicating a source for each of the segments and segment position data indicating a position for each of the segments; the act of using the input image data to obtain segment source data comprising:

obtaining segment identifier data indicating the segment identifier indicated by the segment identifier marks; and using the segment identifier data to obtain the segment source data; the segment source data indicating a source for the first segment.

2. The method of claim 1 in which the input image set includes a human-produced image; the human-produced image showing the graphical representation.

3. The method of claim 2 in which the human-produced image shows a sketch of the layout, the sketch being the graphical representation.

4. The method of claim 1, further comprising:

using the segment source data and the segment position data to obtain output image data defining an image that includes a layout as represented by the graphical representation.

5. The method of claim 4 in which the segment position data indicate, for each of the segments, a width and a height; the act of using the segment source data and the segment position data comprising:

using the segment position data to scale each of the segments to fit within the width and height indicated by the segment position data.

6. The method of claim 4 in which the segment position data indicate, for each of the segments, a reference point; the act of using the segment source data and the segment position data comprising:

using the segment position data to position each of the segments at the reference point indicated by the segment position data.

7. The method of claim 4 in which the input image set further shows a sketch of a source graphical representation; the segment source data indicating that the sketch is a source of the first segment; the act of using the segment source data and the segment position data to obtain output image data further comprising:

using the input image data to obtain content data indicating information represented by the source graphical representation;

using the content data to obtain data defining a precisely formed graphical representation representing the information indicated by the content data; and using the data defining the precisely formed graphical representation to obtain the output image data.

8. The method of claim 7 in which the source graphical representation is a node-link structure, a parallel length graph, a proportioned parts graph, a row/column representation, a perimeter relationship representation, or a two-dimensional graph.

9. The method of claim 1 in which the graphical representation of the layout includes two or more segment representations; the act of using the input image data to obtain segment source data and segment position data comprising:

using the input image data to obtain relative position data indicating the position of each segment representation relative to the graphical representation; and using the relative position data to obtain the segment position data.

10. The method of claim 9 in which the graphical representation of the layout includes a rectangular boundary and lines parallel to sides of the boundary defining the segment representations within the boundary, each segment representation being rectangular; the act of using the input image data to obtain relative position data comprising:

using the input image data to obtain boundary position data indicating the boundary's position and first segment position data indicating a first segment representation's position; and using the boundary position data and the first segment position data to obtain first segment relative position data indicating a position of the first segment representation relative to the boundary; the relative position data including the first segment relative position data.

11. The method of claim 1 in which the input image set further shows an image source sheet defining a source image; the act of using the input image data to obtain segment source data and segment position data comprising:

using the input image data to obtain image source data indicating, for the first segment, that the image source sheet is a source for the segment.

12. The method of claim 11 in which the image source sheet includes source identifier marks; the source identifier marks indicating a source identifier identifying the source image; the act of using the segment identifier data to obtain segment source data comprising:

obtaining source identifier data indicating the source identifier indicated by the source identifier marks; and using the source identifier data and the segment identifier data to determine whether the image source sheet is a source for the segment.

13. The method of claim 12 in which the source identifier marks form a number of connected components that indicate the source identifier; the segment identifier marks forming the same number of connected components;

the act of obtaining source identifier data comprising:

obtaining first count data indicating the number of connected components formed by the source identifier marks;

the act of obtaining segment identifier data comprising:

obtaining second count data indicating the number of connected components formed by the segment identifier marks.

14. A method of operating a machine that includes:

image input circuitry for obtaining data defining images as input; and a processor connected for receiving data defining images from the image input circuitry;

the method comprising:

operating the processor to receive input image data from the image input circuitry, the input image data defining an input image set that shows a graphical representation of a layout that includes two or more image segments; the graphical representation including segment source information indicating sources of the segments in the layout and segment position information indicating positions of the segments within the layout; the segment source information including, for a first one of the segments, segment identifier marks indicating a segment identifier identifying the first segment; and operating the processor to use the input image data to obtain segment source data indicating a source for each of the segments and segment position data indicating a position for each of the segments; the act of operating the processor to use the input image data comprising:

obtaining segment identifier data indicating the segment identifier indicated by the segment identifier marks; and using the segment identifier data to obtain the segment source data; the segment source data indicating a source for the first segment.

15. The method of claim 14 in which the machine further comprises image output circuitry for providing data defining images as output; the method further comprising:

using the segment source data and the segment position data to obtain output image data defining an image that includes a layout as represented by the graphical representation; and providing the output image data to the image output circuitry.

16. A machine comprising:

image input circuitry for obtaining data defining images as input;

memory for storing data; and a processor connected for receiving data defining images from the image input circuitry and connected for accessing data stored in the memory;

the data stored in the memory comprising instruction data indicating image processing instructions the processor can execute; the processor, in executing the image processing instructions:

receiving input image data from the image input circuitry, the input image data defining an input image set that shows a graphical representation of a layout that includes two or more image segments; the graphical representation including segment source information indicating sources of the segments in the layout and segment position information indicating positions of the segments within the layout; the segment source information including, for a first one of the segments, segment identifier marks indicating a segment identifier identifying the first segment; and using the input image data to obtain segment source data indicating a source for each of the segments and segment position data indicating a position for each of the segments; the processor, in using the input image data to obtain segment source data:

obtaining segment identifier data indicating the segment identifier indicated by the segment identifier marks; and using the segment identifier data to obtain the segment source data; the segment source data indicating a source for the first segment.

17. The machine of claim 16 in which the input image circuitry is connected for receiving facsimile transmissions.

18. The method of claim 16 in which the machine further comprises image output circuitry for providing data defining images as output; the processor further, in executing the image processing instructions:

using the segment source data and the segment position data to obtain output image data defining an image that includes a layout as represented by the graphical representation; and providing the output image data to the image output circuitry.

19. The machine of claim 18 in which the output image circuitry is connected for providing facsimile transmissions.

20. The machine of claim 16 in which the machine is an image processing server; the image processing server being connected to a network for receiving requests for image processing operations; the network including the image input circuitry; the instruction data further indicating request handling instructions the processor can execute; the processor, in executing the request handling instructions, determining whether to execute the image processing instructions.

21. The machine of claim 16 in which the machine is a fax server.

22. The machine of claim 16 in which the machine is a copier.

23. An article of manufacture for use in a machine that includes:

image input circuitry for obtaining data defining images as input;

a storage medium access device for accessing a medium that stores data; and a processor connected for receiving data defining images from the image input circuitry; the processor further being connected for receiving data from the storage medium access device;

the article comprising:

a storage medium that can be accessed by the storage medium access device when the article is used in the system; and data stored by the storage medium so that the storage medium access device can provide the stored data to the processor when the article is used in the system; the stored data comprising instruction data indicating instructions the processor can execute; the processor, in executing the instructions:

receiving input image data from the image input circuitry, the input image data defining an input image set that shows a graphical representation of a layout that includes two or more image segments; the graphical representation including segment source information indicating sources of the segments in the layout and segment position information indicating positions of the segments within the layout; the segment source information including, for a first one of the segments, segment identifier marks indicating a segment identifier identifying the first segment; and using the input image data to obtain segment source data indicating a source for each of the segments and segment position data indicating a position for each of the segments; the processor, in using the input image data to obtain segment source data:

obtaining segment identifier data indicating the segment identifier indicated by the segment identifier marks; and using the segment identifier data to obtain the segment source data; the segment source data indicating a source for the first segment.

24. A method comprising:

obtaining input image data defining an input image set; the input image set including images of sheets that include:

a layout sheet image that shows a graphical representation of a layout that includes two or more segments; the graphical representation including segment source information indicating sources of the segments in the layout and segment position information indicating positions of the segments within the layout; the segment source information including, for a first one of the segments, segment identifier marks indicating a segment identifier identifying the first segment; and a source sheet image that defines a segment source image; the source sheet image further including source identifier marks; the source identifier marks indicating a source identifier identifying the segment source image; and using the input image data to obtain segment source data indicating a source for each of the segments and segment position data indicating a position for each of the segments; the act of using the input image data to obtain image source data comprising:

obtaining source identifier data indicating the source identifier indicated by the source identifier marks;

obtaining segment identifier data indicating the segment identifier indicated by the segment identifier marks; and using the source identifier data and the segment identifier data to determine whether the segment source image is a source for the first segment; the act of using the source identifier data and the segment identifier data determining that the segment source image is a source for the first segment if the segment identifier and the source identifier are the same.

25. The method of claim 24 in which the source identifier marks form a number of connected components that indicate the source identifier; the segment identifier marks forming the same number of connected components;

the act of obtaining source identifier data comprising:

obtaining first count data indicating the number of connected components formed by the source identifier marks;

the act of obtaining segment identifier data comprising:

obtaining second count data indicating the number of connected components formed by the segment identifier marks;

the act of using the source identifier data and the segment identifier data comprising:

determining whether the first count data and the second count data indicate equal numbers.

26. A method comprising:

obtaining input image data defining an input image set that shows a graphical representation of a layout that includes two or more segments; the graphical representation including:

a rectangular boundary and lines within the boundary parallel to sides of the boundary; the lines defining, for each of the segments, a segment representation within the boundary, each segment representation being rectangular; a position for each of the segments being indicated by its segment representation; and segment source information indicating a source of content for a first one of the segments in the layout; and using the input image data to obtain segment source data indicating the source of content for the first segment and segment position data indicating the position for each of the segments.

* * * * *